Aug. 19, 1958     H. VEYSSIERE     2,847,927
FLUID FLOW REGULARIZING AND/OR DIRECTING DEVICE
Filed Oct. 25, 1954     2 Sheets-Sheet 1

INVENTOR
HENRI VEYSSIERE
BY
Wenderoth, Lind & Ponack
Attys.

United States Patent Office 2,847,927
Patented Aug. 19, 1958

2,847,927

FLUID FLOW REGULARIZING AND/OR DIRECTING DEVICE

Henri Veyssiere, Toulon, France, assignor to Societe des Forges et Chantiers de la Mediterranee, Paris, France, a French society Application October 25, 1954, Serial No. 464,461

Claims priority, application France October 28, 1953

5 Claims. (Cl. 98—60)

My invention relates to fluid-flow regularizing and/or directing devices.

In the case of a ship, it often happens that the arrangement of superstructure situated forward (or in the vicinity) of a funnel causes an appreciable disturbance (or deviation) of the relative flow of the air in the region of the funnel, thus causing the smoke emitted by this funnel to be dispersed and consequently to encounter some rear superstructures or to be forced down on to the decks.

The device to which the present invention relates has for its object either to regularize or to direct, or simultaneously to regularize and to direct the flow of the air forward of the ship's funnel, in order to avoid the above disadvantages. By "regularize" here is meant to fill out and/or homogenize the lines of the flow, and/or to diminish the loss of head and/or reduce the extent or the scale of the turbulence.

The characteristic features of the device forming the subject of this invention will appear from the following description. It must be understood however, that this description is concerned only with examples which are not of any limitative nature, because the device can be constructed, without departing from the scope of the invention, with different shapes, proportions, arrangements and so on. Its application to ships is given simply as an example, inasmuch as the device may be applied in other connections.

The accompanying drawings represent two forms of embodiment of the device, as applied to a ship.

Figure 1:
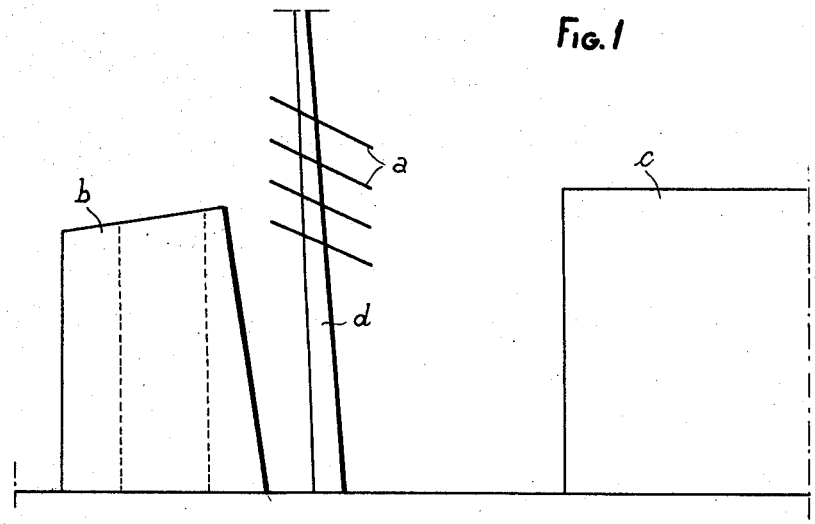
Fig. 1 is a diagrammatic elevation of the first form of embodiment.

As will be seen from the drawings, the device is constituted by two or more thin planes $a$ arranged parallel to one another, disposed perpendicular to the plane of symmetry of the ship and forming with the horizontal an angle determined as a function of the trajectory which it is desired to impart to the smoke or fumes in order to avoid their encountering all or part of the superstructures situated astern of the funnel $b$. At $c$ there is shown an obstacle such as a deckhouse, which disturbs the flow of air forward of the funnel.

Figure 2:
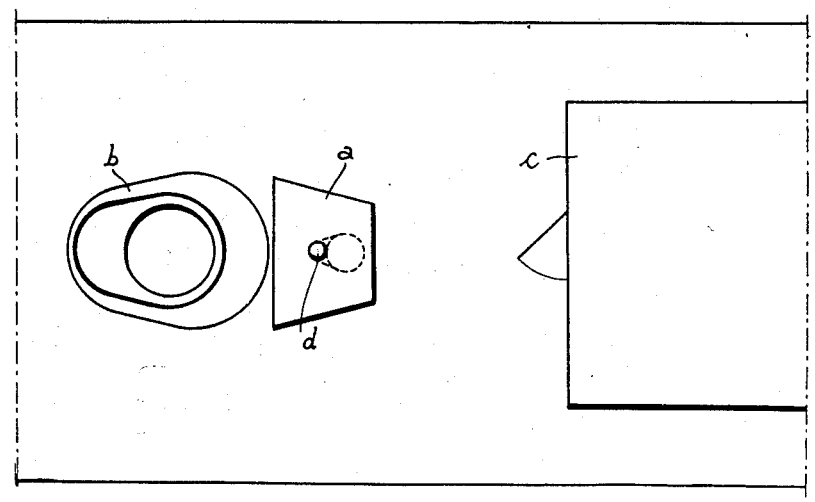
Fig. 2 is a plan view thereof.

In order to avoid the addition of supports made specially for the device, the planes $a$ can advantageously be supported by a mast structure situated forward of the funnel. In the example represented in Figs. 1 and 2, this mast structure is constituted by a single mast $d$, upon which the planes $a$ are fixed.

It is preferable, however, that this mast structure should comprise a plurality of legs, in order to facilitate the installation of the planes $a$ and also in order to diminish the disturbance created in the air flow by a mast constituted by a single thick shaft.

Figure 3:
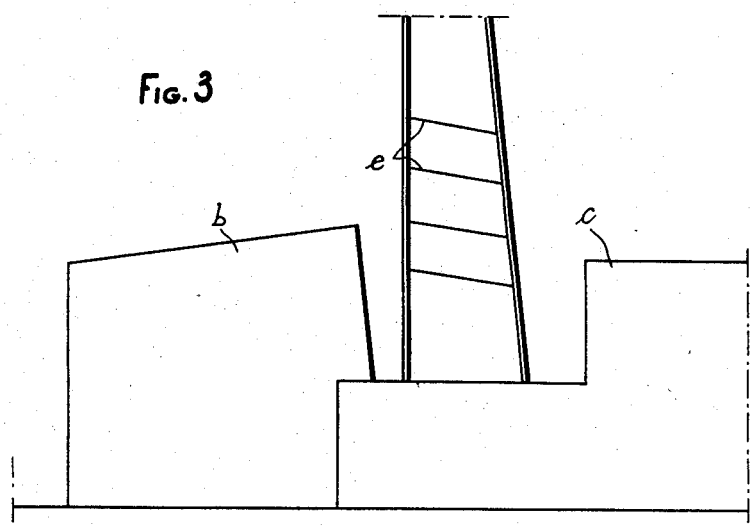
Figs. 3 and 4 are similar views of the second form of embodiment.
Figure 4:
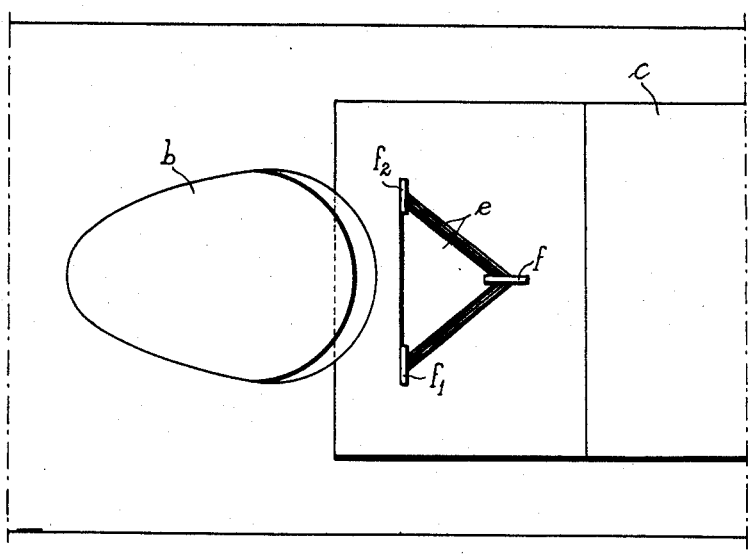

A particular form of the device consists, as is shown in Figs. 3 and 4, in employing planes having the form of triangles $e$, supported by a tripod mast $f$, $f_1$, $f_2$; two of the tripod legs ($f_1$, $f_2$) are spaced apart symmetrically in relation to the plane of symmetry of the ship, the third leg ($f$) being situated forward of the previous two, in said place of symmetry.

The contours of the different planes $e$ need not necessarily be identical; more especially the three legs of the tripod mast can be oblique, as indicated in Figs. 3 and 4, and for convenience of installation the upper planes $e$ may be given smaller dimensions than the lower ones, their dimensions decreasing according to the height at which they are situated, as may be seen in these figures.

The planes must normally be parallel to one aonther, if the only object is to regularize or direct the flow. However, it is possible to depart from this arrangement, by giving two successive planes a slight angle between them, thus causing a convergence or a divergence in the flow and consequently a modification of its speed.

The planes can be replaced by surfaces which are not flat; in general they will be thin laminae, but they could equally be constituted by bodies of an appreciable thickness, provided that they be suitably stream-lined or profiled.

The invention may be applied to any body which is movable in the air, and thus subjected by its movement to a flow of air, such as land or sea vehicles, or to any fixed body subjected to a flow of air. Moreover it may be applied to bodies subjected to a relative flow of any fluid, and not solely of air.

What I claim is:

1. An arrangement for use upon ships where superstructures located forward of the funnel disturb the flow of air adjacent said funnel comprising a plurality of parallel plates perpendicular to the vertical plane of symmetry of the ship, said plates being spaced from one another and inclined to the horizontal upwardly from bow to stern, means for supporting said plates forward of said funnel and at a predetermined distance therefrom and said parallel plates being formed as thin flat sheets of rigid material whereby disturbances caused by said superstructures in the flow of air adjacent said funnel are minimized.

2. An arrangement for use upon ships where superstructures located forward of the funnel disturb the flow of air adjacent said funnel comprising a plurality of parallel plates perpendicular to the vertical plane of symmetry of the ship, said plates being spaced from one another and inclined to the horizontal upwardly from bow to stern, a single mast shaft located forward of said funnel for supporting said plates forward of said funnel and at a predetermined distance therefrom and said parallel plates being formed as thin flat sheets of rigid material whereby disturbances caused by said superstructures in the flow of air adjacent said funnel are minimized.

3. An arrangement for use upon ships where superstructures located forward of the funnel disturb the flow of air adjacent said funnel comprising a plurality of parallel plates perpendicular to the vertical plane of symmetry of the ship, said plates being spaced from one another and inclined to the horizontal upwardly from bow to stern, a tripod mast located forward of said funnel for supporting said plates forward of said funnel and at a predetermined distance therefrom and said parallel plates being formed as thin flat sheets of rigid material whereby disturbances caused by said superstructures in the flow of air adjacent said funnel are minimized.

4. An arrangement as set forth in claim 3 in which said plates are each formed as a triangle whose apices are fixed upon the legs of said tripod mast.

5. An arrangement as set forth in claim 3 wherein said triangles have dimensions decreasing from the bottom to the top.

References Cited in the file of this patent

UNITED STATES PATENTS

| 530,630 | Taylor | Dec. 11, 1894 |
| 2,610,570 | Valensi | Sept. 16, 1952 |

FOREIGN PATENTS

| 995,035 | France | Aug. 14, 1951 |